S. TOTH & J. VECSEI.
RENDERING VESSEL.
APPLICATION FILED JULY 3, 1912.

1,042,845.

Patented Oct. 29, 1912.

WITNESSES
J. P. Appleman,
E. Wright

INVENTORS
S. Toth
J. Vecsei

UNITED STATES PATENT OFFICE.

STEVE TOTH AND JOHN VECSEI, OF WINDBER, PENNSYLVANIA.

RENDERING VESSEL.

1,042,845.  Specification of Letters Patent.  Patented Oct. 29, 1912.

Application filed July 3, 1912. Serial No. 707,612.

*To all whom it may concern:*

Be it known that we, STEVE TOTH and JOHN VECSEI, subjects of the King of Hungary, residing at Windber, in the county of Somerset and State of Pennsylvania, have invented certain new and useful Improvements in Rendering Vessels, of which the following is a specification, reference being had therein to the accompanying drawing.

This invention relates to a rendering vessel, and the primary object of our invention is to provide a novel vessel for rendering lard, the vessel being constructed whereby it can be safely used upon a stove and lard drawn off from the vessel as the same is rendered.

Another object of this invention is to provide a rendering vessel with a novel outlet or spout that can be folded, when not in use, whereby the vessel will not occupy a large space when stored away.

A further object of this invention is to accomplish the above results by a vessel that is simple in construction, durable, easy to clean and maintain in a sanitary condition, and highly efficient for the purposes for which it is employed.

With the above and other objects in view, the invention resides in a novel construction, combination and arrangement of parts to be hereinafter specifically described and then claimed.

Reference will now be had to the drawings, wherein:—

Figure 1:
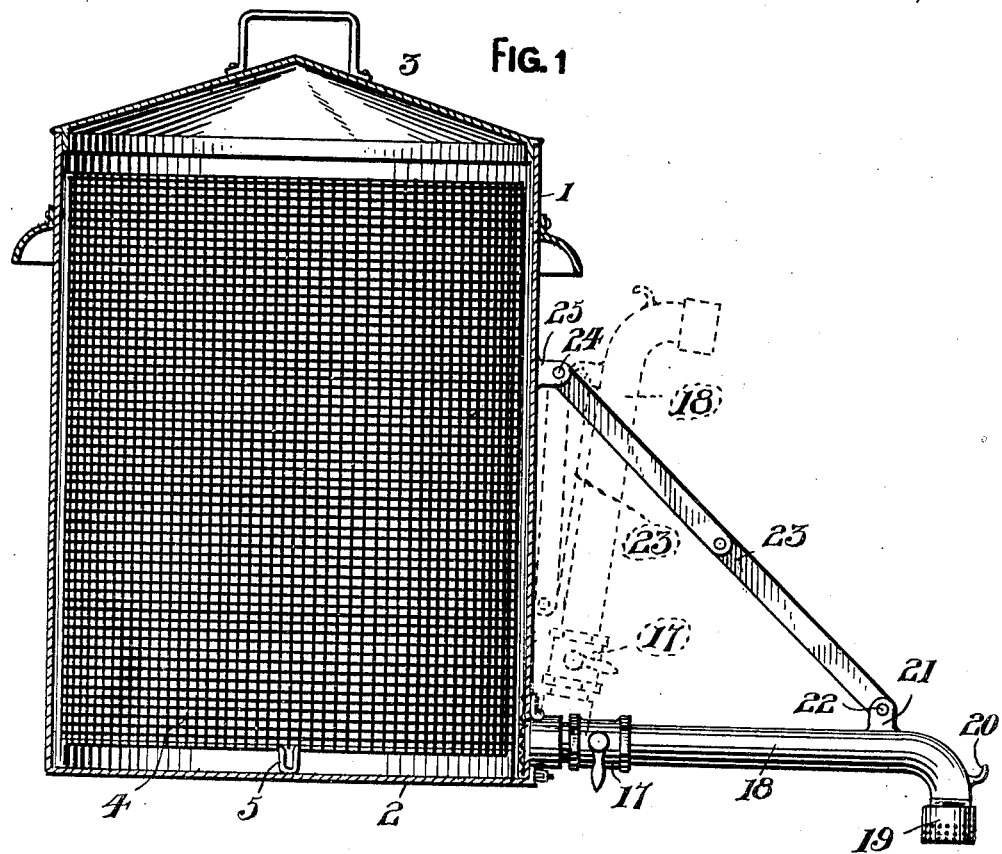
Figure 2:
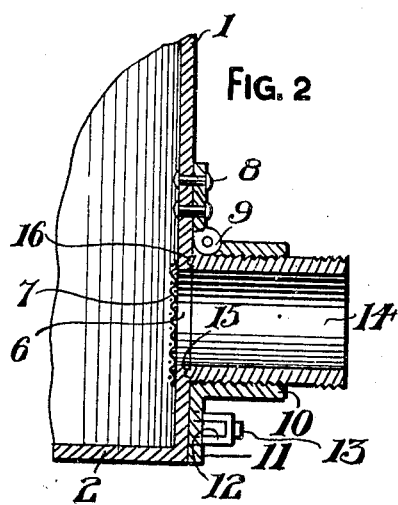
Figure 3:
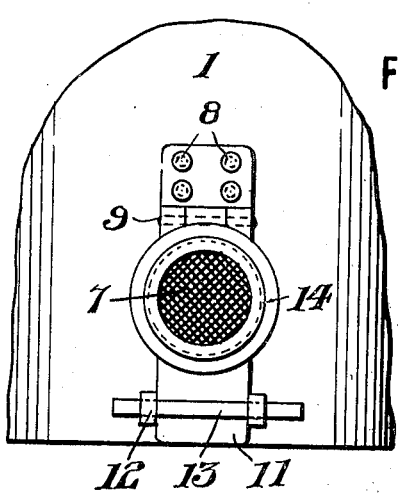

Figure 1 is a vertical sectional view of the vessel showing by a dotted line the spout thereof in a folded postion. Fig. 2 is an enlarged detailed sectional view of a portion of the vessel, and Fig. 3 is a front elevation of the same.

A rendering vessel in accordance with this invention comprises a cylindrical receptacle 1 having a flat bottom 2 and a detachable lid or cover 3. Arranged within the receptacle 1 is a woven wire basket 4 that has depending legs 5, said legs supporting the basket at a point removed from the flat bottom 2 of the receptacle, thereby preventing the contents of the basket 4 from being burned while lard is being rendered. The front side of the receptacle 1, adjacent to the flat bottom 2 thereof, is provided with an outlet opening 6 and arranged over said opening is a woven wire screen or sieve 7 that is secured to the inner side of the receptacle. Riveted or otherwise connected, as at 8 to the outer side of the receptacle 1, adjacent to the opening 6 is a hinge 9 having a collar 10 provided with a depending hasp 11 that sets between two staples 12, carried by the outer side of the receptacle 1 at the bottom thereof. A key or pin 13 is arranged in the staples 12 to retain the hasp 11 in engagement with the receptacle 1 and the collar 10 in alinement with the opening 6. Screwed into the collar 10 is a coupling member 14 that has the inner end thereof provided with an annular bead 15 fitting into an annular groove 16 provided therefor in the wall of the receptacle 1, said annular bead insuring a nonleakable connection between the receptacle and the coupling, when the coupling member 14 is in a closed position. Connected to the coupling member 14 is a valve 17 of the ordinary and well known type, and this valve is provided with a spout 18 that has the outer end thereof provided with a detachable strainer 19. The spout 18 has a finger piece 20 and an apertured lug 21. The apertured lug 21 is pivotally connected by a pin 22 to pivoted links 23, said links being pivotally connected, as at 24 to an apertured lug 25, carried by the front side of the receptacle 1. The spout 18 can be easily swung upwardly in proximity to the receptacle 1, as shown by dotted lines in Fig. 1, when the key or pin 13 is withdrawn from the staples 12. With the spout 18 folded, the rendering vessel can be easily placed upon the shelf of a cupboard or stored away without occupying a large space.

The vessel in its entirety is made of strong and durable metal and we would have it understood that the invention is susceptible to such changes as fall within the scope of the appended claim.

What we claim is:—

A rendering vessel comprising a body portion having an outlet near its bottom, a foraminous member arranged within the receptacle at the inner end of the outlet, a pair of laterally extending spaced staples integral with the periphery of said receptacle below said outlet, a plate secured to the periphery of the receptacle above the outlet, the periphery of said receptacle provided with a groove surrounding the outer end of the outlet, a collar hinged to said plate and having a depending hasp adapted to extend between said staples, said collar engaging in said groove, means extending through the staples for maintaining the hasp in position, a valved spout connected to said collar, and links pivotally connected to the receptacle and to said spout.

In testimony whereof we affix our signatures in the presence of two witnesses.

STEVE TOTH.
JOHN VECSEI.

Witnesses:
  YAKOB ROTH,
  FRANK LAWEY.